United States Patent
Collet et al.

(10) Patent No.: US 7,756,949 B2
(45) Date of Patent: *Jul. 13, 2010

(54) SYSTEM OF HANDLING A WEB SERVICE CALL

(75) Inventors: Jean-Luc Collet, St. Laurent du Var (FR); Francois-Xavier Drouet, Two Bis Bd MontReal Nice (FR); Joaquin Picon, ave Paul Cezanne (FR); Carole Truntschka, Saint-Laurent-du-Var (FR)

(73) Assignee: International Business Machines Corporation, Armonk, NY (US)

( * ) Notice: Subject to any disclaimer, the term of this patent is extended or adjusted under 35 U.S.C. 154(b) by 1 day.

This patent is subject to a terminal disclaimer.

(21) Appl. No.: 12/348,202

(22) Filed: Jan. 2, 2009

(65) Prior Publication Data

US 2009/0119387 A1    May 7, 2009

Related U.S. Application Data

(63) Continuation of application No. 10/822,429, filed on Apr. 12, 2004, now Pat. No. 7,516,195.

(30) Foreign Application Priority Data

Apr. 29, 2003   (EP) .................................. 03368041

(51) Int. Cl.
    *G06F 15/16* (2006.01)
(52) U.S. Cl. ..................... 709/218; 709/219; 709/203; 709/237
(58) Field of Classification Search ................. 709/203, 709/217–219, 227, 237
See application file for complete search history.

(56) References Cited

U.S. PATENT DOCUMENTS

| 6,049,800 | A  | * | 4/2000  | Govindarajan et al. ........ 707/10 |
| 6,247,056 | B1 | * | 6/2001  | Chou et al. .................. 709/218 |
| 6,317,786 | B1 | * | 11/2001 | Yamane et al. .............. 709/224 |
| 6,654,815 | B1 |   | 11/2003 | Goss et al. |
| 6,988,126 | B2 | * | 1/2006  | Wilcock et al. ............. 709/203 |
| 7,206,807 | B2 | * | 4/2007  | Cheenath .................... 709/203 |
| 7,334,017 | B2 | * | 2/2008  | Hawkes et al. .............. 709/217 |

(Continued)

OTHER PUBLICATIONS

Collet et al., U.S. Appl. No. 10/822,429, Notice of Allowance and Fees Due, Sep. 23, 2008, 6 pages.

(Continued)

*Primary Examiner*—Philip B Tran
(74) *Attorney, Agent, or Firm*—Douglas Lashmit; Hoffman Warnick LLC

(57) ABSTRACT

A system for handling a web service call by clients in a communication network is disclosed. The system comprises a client requester for issuing client requests. The client requests may comprise at least one client request to call a web service. The system also comprises a callback web Service that is coupled to the client requester for registering the at least one client request to call a web service and for invoking the called web service. A response web service is coupled to the callback web service for receiving a response to the at least one client request to call a web service and is also coupled to the client requester for delivering the response when a client request to obtain the response is issued from the client requester.

7 Claims, 4 Drawing Sheets

U.S. PATENT DOCUMENTS

| | | |
|---|---|---|
| 7,337,237 B2 | 2/2008 | Salahshoor et al. |
| 7,526,797 B2 * | 4/2009 | St. Pierre .................... 709/203 |
| 2003/0023957 A1 * | 1/2003 | Bau et al. ................... 709/203 |
| 2003/0093500 A1 | 5/2003 | Khodabakchian et al. |
| 2003/0206192 A1 * | 11/2003 | Chen et al. .................. 345/733 |
| 2004/0006550 A1 * | 1/2004 | Upton .......................... 707/1 |
| 2004/0064503 A1 * | 4/2004 | Karakashian et al. ....... 709/203 |
| 2005/0021689 A1 * | 1/2005 | Marvin et al. ............... 709/220 |

OTHER PUBLICATIONS

Collet et al., U.S. Appl. No. 10/822,429, Office Action Communication, Jul. 13, 2008, 14 pages.

Collet et al., U.S. Appl. No. 10/822,429, Office Action Communication, Mar. 25, 2008, 9 pages.

Collet et al., U.S. Appl. No. 10/822,429, Office Action Communication, Sep. 25, 2007, 7 pages.

* cited by examiner

SYSTEM OF HANDLING A WEB SERVICE CALL

The current application is a continuation application of U.S. patent application Ser. No. 10/822,429, filed on Apr. 12, 2004 now U.S. Pat. No. 7,516,195, which is hereby incorporated by reference.

TECHNICAL FIELD

The present invention relates generally to the Internet and web services, and more particularly to a system and method of handling a web service call in an asynchronous manner.

BACKGROUND OF THE INVENTION

Web services are one of the latest innovations available to users on the World Wide Web. This new web model allows any client user (a program for example, not necessarily a web browser) to initiate a transaction automatically.

By definition, web services comprise software components that can be described, published, discovered and invoked dynamically in a distributed computing environment, generally the World Wide Web.

Web services have already proved their usefulness in real-world applications. However, the current standard web service model is a synchronous one, based on a request/response architecture.

The following patents illustrate some solutions for performing operations associated with browser requests on the World Wide Web.

U.S. Pat. No. 6,317,786 to Yamane discloses a method and system for managing web servers, and more particularly, to a web service system operator for managing multiple web servers. The system can manage traffic by directing web page requests to available web servers and balancing the web page request service load among the multiple servers. The system can collect data on web page requests and web server responses to those web page requests and provide reporting of the data as well as automatic and manual analysis tools.

U.S. Pat. No. 6,247,056 to Chou discloses a system and method relating to server architectures in networked computer systems, and more specifically to a distributed architecture for enabling servicing to user requests across different machines.

However, supporting real-world enterprise business processes inherently involves asynchronous operations, as the processes are typically long in duration. Activities of each process need to be de-coupled from an initial request in order to optimize the use of system resources and to break the processing into a recoverable set of transactions.

Such asynchronous behavior is common for services that require complex processing that may take minutes or even days to complete when, for example, the web service implementation is dependent on batch processing or manual steps requiring human intervention.

Therefore, there is a need for a web service system that avoids any lost data; the present invention offers such a solution.

SUMMARY OF THE INVENTION

In view of the foregoing and other problems of conventional systems and methods, it is an object of the invention to provide a system and method to handle asynchronous web service in a fully transparent manner for the end user.

It is another object to provide a system and method that takes advantage of existing protocols and that does not need creation or usage of any specific transport layer or usage of any framework.

These and other objects of the present invention are achieved by a system for handling a web service call by clients in a communication network. The system comprises a client requester for issuing client requests. The client requests may comprise at least one client request to call a web service. The system also comprises a callback web service that is coupled to the client requester for registering the at least one client request to call a web service and for invoking the called web service. A response web service is coupled to the callback web service for receiving a response to the at least one client request to call a web service and is also coupled to the client requester for delivering the response when a client request to obtain the response is issued from the client requester.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
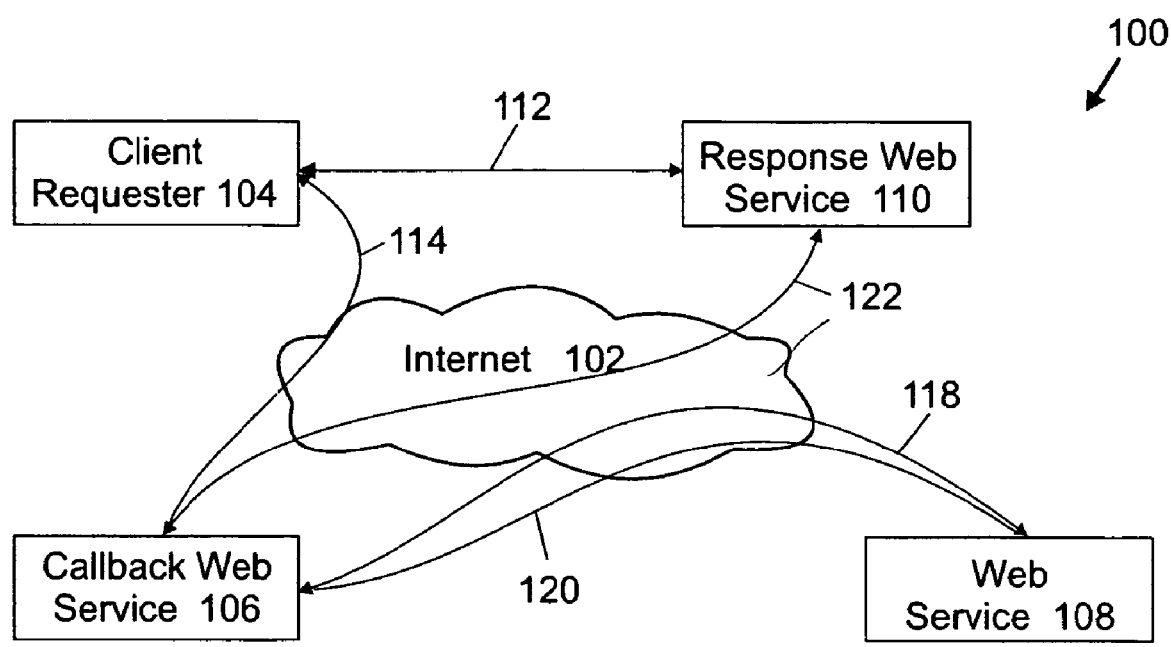
FIG. 1 is a conceptual view of the system of the present invention.

Referring first to FIG. 1, there is depicted a pictorial representation of an Internet communication system 100, which may be utilized to implement the present invention.

Generally speaking, system 100 operates through the Internet 102 and includes a client requester (e.g., a program) 104, a callback web service 106, a web service 108 and a response web service 110. In an embodiment of the present invention, communication over the Internet is accomplished in accordance with the HTTP protocol, as shown by arrows 112, 114, 118, 120 and 122. It will be appreciated that only the main characteristics of the web environment useful for the understanding of the invention are discussed herein, and that a more complete description may be found, for example, in the "TCP/IP Tutorial and Technical Overview" IBM Redbooks GG24-3376-06.

In system 100, client requester 104 communicates with callback web service 106 to send a client request (arrow 114).

The callback web service 106 invokes the web service 108 (arrow 118) to wait for a response to the user request (arrow 120).

The callback web service 106 is also coupled to the response web service 110 to deliver the response (arrow 122).

Client requester 104 is coupled to the response web service 110 to receive the response (arrow 112).

System 100 allows a centralized web service to handle web service calls in an asynchronous manner. The callback web service 106 allows users to register their request or to subscribe to existing requests previously submitted. The callback web service 106 further provides the user with an asynchronous answer through the response web service 110. The callback web service 106 manages when and how the requested web service is called and when and how the answer is sent back to the client requester 104.

One advantage of system 100 is that there is no need of a special framework to be used or to be implemented to offer such facility. Standard web service protocols may be used at the client requester side, such as SOAP (Simple Object Access Protocol).

Figure 2:
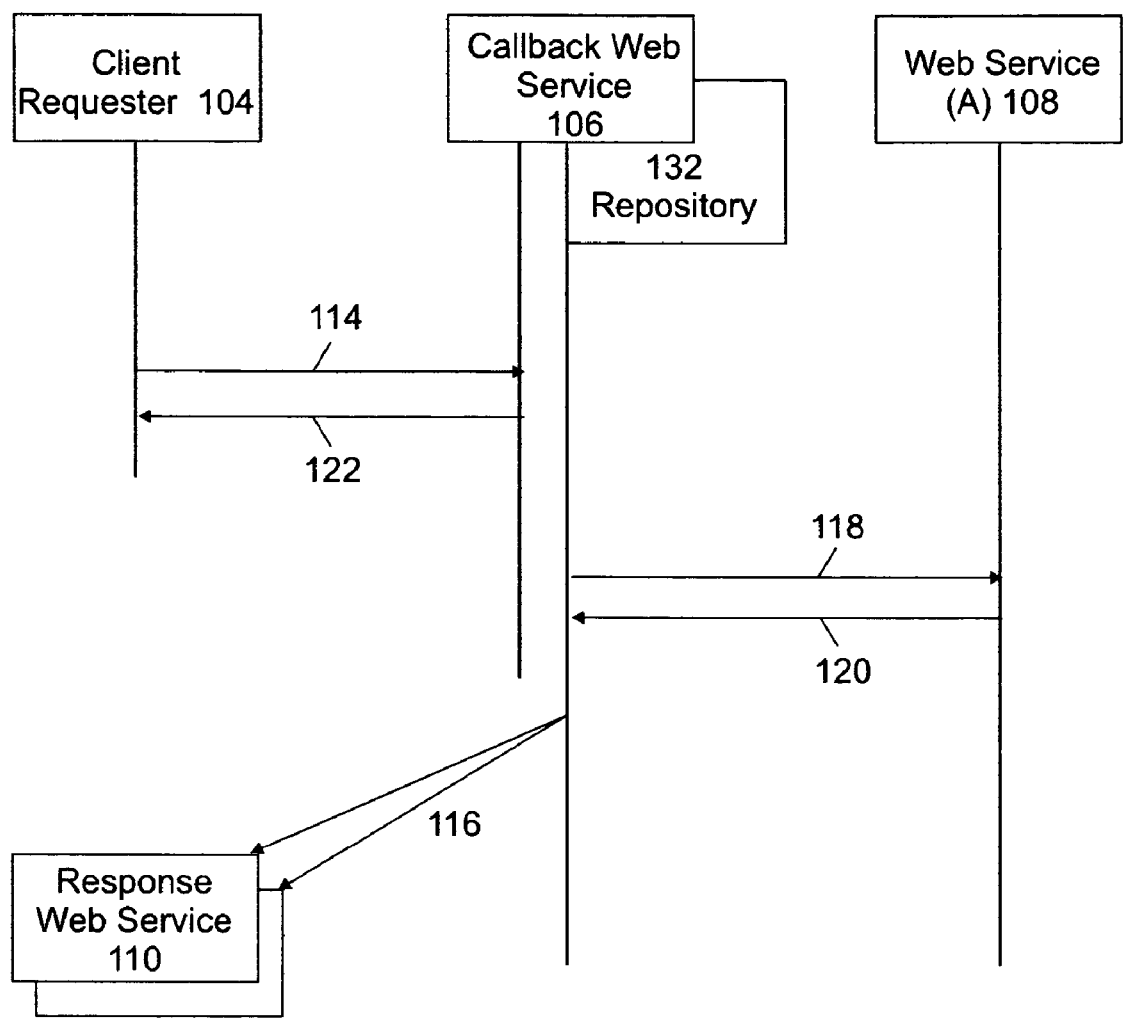
FIG. 2 is a data flow diagram illustrating the main steps for handling a client request according to an embodiment of the present invention.

Referring now to FIG. 2, the main steps to operate the callback web service 106 are described.

Client requester 104 performs an initial request to a web service 'A' 108 by submitting a web service call (arrow 114) to the callback web service 106. The web service call includes at least the address of the requested web service, generally in the form of an Internet address 'Web Service A', and a set of parameters 'paramA'. This set may include the following parameters:

a 'WSTC' parameter to identify the Internet address of the web service to call;

'WSTCP' parameters to specify the parameters associated with the web service to call;

a 'PT' ProtocoleType parameter to indicate which protocol to be used for the communication;

a 'RCBI' parameter to allow the user to configure binding information for sending the web service response to the client.

The 'PT' input parameter used to indicate to the web service callback the protocol used for the asynchronous response to the query may be for example:

the Simple Object Access Protocol (SOAP) protocol, in order that a client web service receives the response to the submitted request; or the Simple Mail Transfer Protocol (SMTP) protocol, in order that the web service response being sent to an e-mail address.

The binding information depends on the content of the 'PT' input parameter. It is in fact the address needed to connect to the callback web service using the protocol defined by 'PT'. For example, if the 'PT' parameter is set to 'SOAP', this RCBI parameter will be the Internet address of the callback web service. If the 'PT' parameter is set to 'SMTP', then the RCBI parameter will be the e-mail address of the callback service to send the response. The list of such communication types is not exhaustive and can be extended to any communication protocol.

After receiving the request, the callback web service 106 examines a local repository 132 that contains pending requests with associated requesters. If a similar request having the same parameters is present in the repository 132, then the new requester is added to the list of clients to be answered, otherwise if no similar request already exists, the new request is stored in the local repository 132 along with the requester identity.

As an answer to this request (arrow 114), the callback web service 106 sends back to the client requester 104 an acknowledgment (arrow 122) and the session between the client requester 104 and the callback web service 106 is closed.

Simultaneously, the callback web service 106 acting for the client requester 104 forwards the initial request to the requested web service 'A' 108 in the form of a second web service call (arrow 118) formatted in a second request having the same format as the initial request (arrow 114) issued from the client requester 104.

In response to the callback web service request, the web service 'A' 108 provides the callback web service 106 with a response according to the HTTP protocol, as shown by arrow 120.

The callback web service 106 then retrieves from the local repository 132 the list of all the requesters corresponding to that web service 'A' 108, and transfers to the response web service 100 the response message 'Response A' (130) (as shown by arrow 116) with corresponding requester parameters.

Then, the requester may obtain the response message at any time on request from the response web service 110.

It is to be appreciated that the callback web service 106 further provides a set of functions to allow a client requester 104 to request from the local repository 132 the list of all current pending requests in order to directly add its own requester address to one or more requests of the list without the need of issuing an initial request 114. This process is detailed with reference to FIG. 3.

Figure 3:
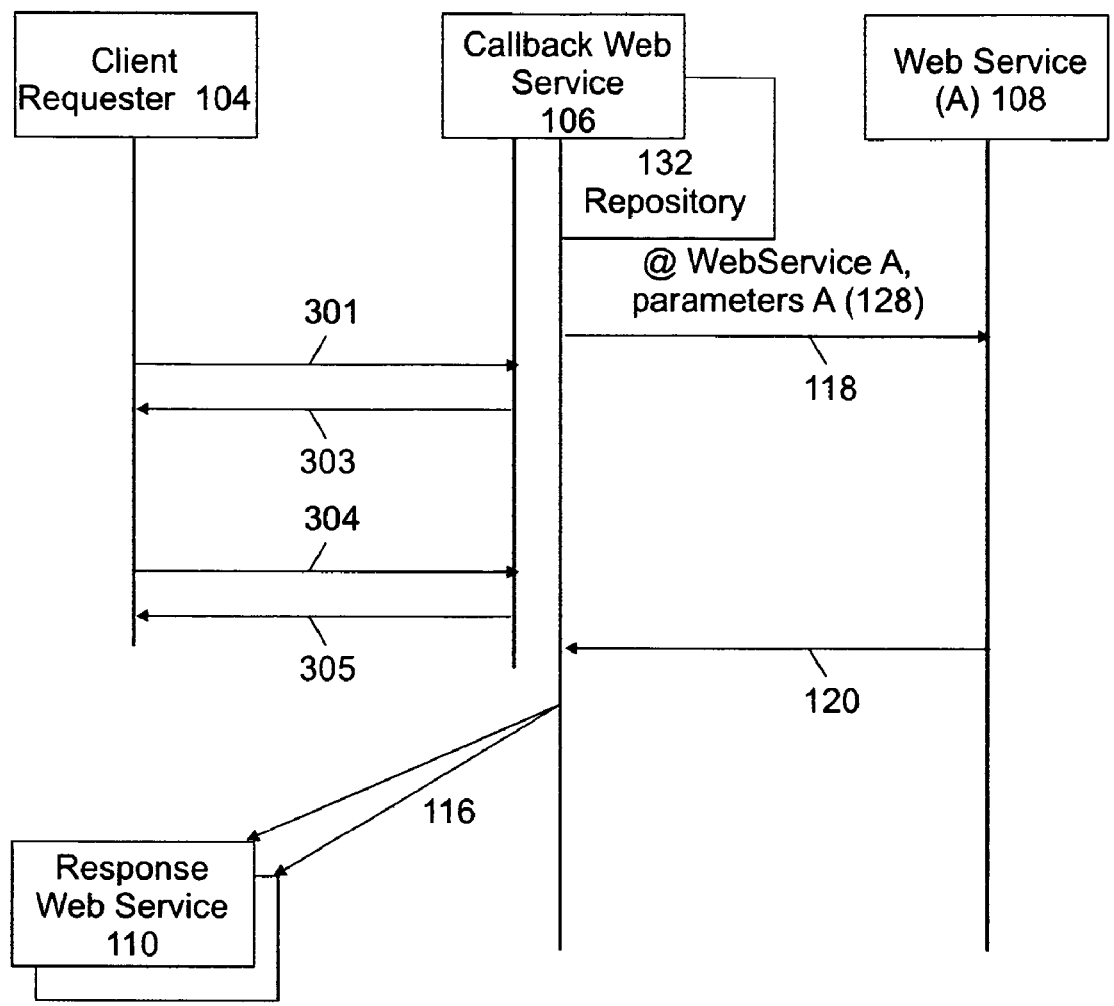
FIG. 3 is a data flow diagram illustrating from the client side the main steps for subscribing to an already registered web service.

FIG. 3 details the steps for a client requester 104 to subscribe to an already submitted web service call. First, the client requester 104 submits a 'get pending' request (arrow 301) in the form of a web service call to the callback web service 106 to obtain a list of all the pending web services already registered. Preferably, the format of the response (arrow 303) contains at least a unique identifier for identifying each pending web service, and the address and the input parameters associated with each pending web service. The list of the pending web services is provided by the callback web service 106 by scanning through its local repository 132. Then, the client requester 104 may subscribe to one or more web services listed in the response (arrow 303). A subscribe request (arrow 304) is then initiated by the client requester 104, having as input parameters the unique identifier of the web service as listed in the previously received response (arrow 303), and the address of the response web service 110. The callback web service 106 sends back an acknowledgment (arrow 305) to the client requester 104 and the process to obtain the response message 'Response A' (130) is identical to the one previously described with reference to FIG. 2.

Another additional function may allow a client requester 104 to perform an unregistration for a web service. After receiving a response to a 'get pending' request, the client requester 104 submits an 'unsubscribe' message to the callback web service 106 and having as an input parameter the unique identifier of the web service. The callback web service sends back an acknowledgment to the client requester 104, which is then unsubsribed.

It is to be appreciated by those skilled in the art that while the invention has been particularly shown and described with reference to a preferred embodiment thereof, various changes in form and details may be made without departing from the spirit and scope of the invention.

Particularly, a polling method may be implemented to ask the callback web service 106 for the completion of the web service instead of having a temporary web service. This alternate workflow is described in FIG. 4.

Figure 4:
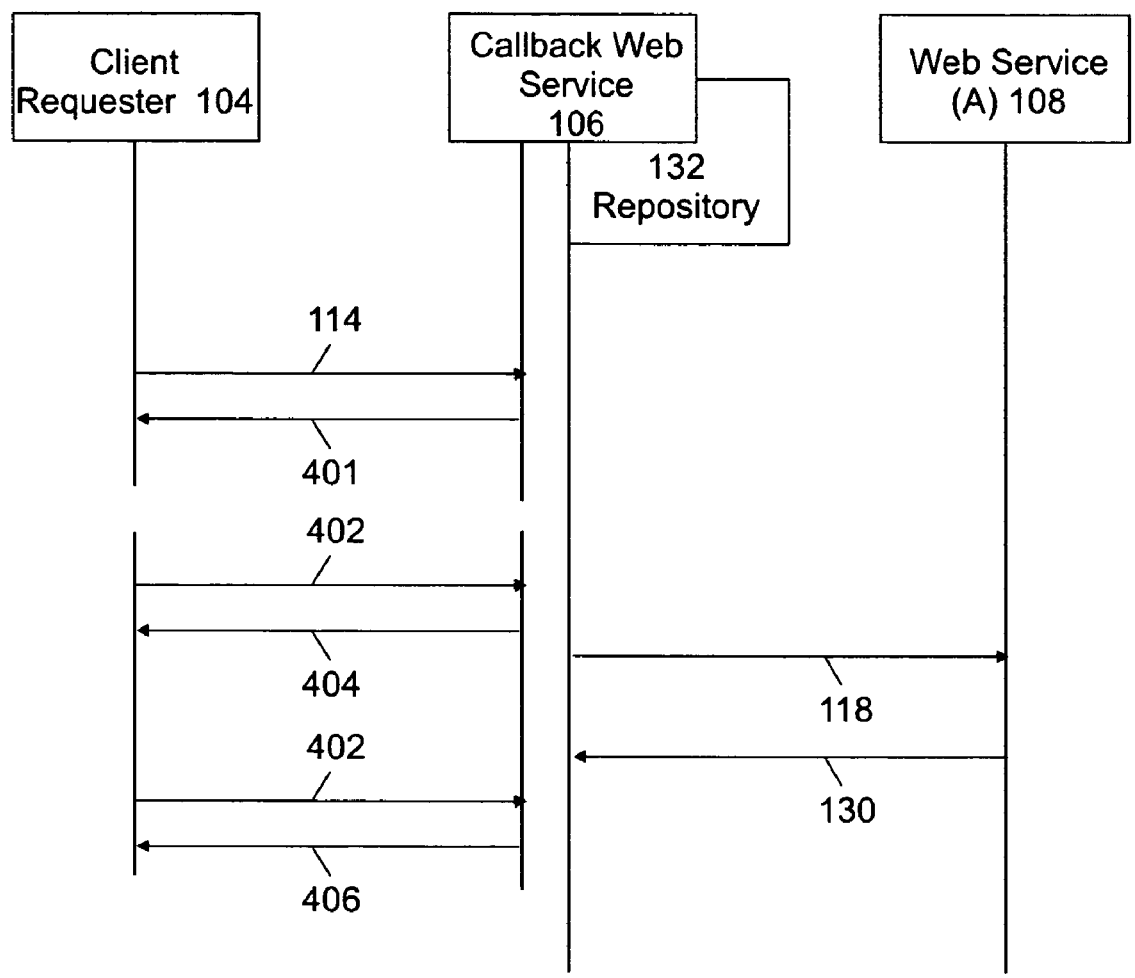
FIG. 4 is a data flow diagram illustrating the callback web service for requesting the generic callback web service for the completion of the web service.

FIG. 4 details the steps for a client requester 104 to ask the callback web service 106 for the completion of the web service. Client requester 104 performs an initial request to a web service 'A' 108 by submitting a request 114 to the callback web service 106.

As an answer to this request, the callback web service 106 sends back to the client requester 104 the request ID (arrow 401) and the session between the client requester 104 and the callback web service 106 is closed. Simultaneously, the callback web service 106 acting for the client requester 104 forwards the initial request to the requested web service 'A' 108 in the form of a second web service call 118 formatted in a second request having the same format as the initial request issued from the client requester 104.

Then, at any time, the client requester 104 may send a 'Get Status' message (arrow 402) to ask the callback web service 106 for the completion of the web service.

If the response message 'Response A' 130 is available in the callback web service 106, it is transferred as an answer (arrow 404) to the client requester 104, otherwise if it is not available, a 'Not Completed' message (arrow 406) is sent.

The invention claimed is:

1. A system embedded in a computer-readable storage medium for handling a web service call by clients in a communication network, the system comprising:
   client requester means for issuing client requests comprising at least one client request to call a web service, wherein the at least one client request to call a web service is sent to a callback web service;
   callback web service means coupled to the client requester means for registering the at least one client request to call a web service within the callback web service and for invoking a called web service by sending the at least one client request to call a web service to a called web service; and
   response web service means coupled to the callback web service means for receiving a response to the at least one client request to call a web service and coupled to the client requester means for manually delivering the response based upon when a client request to obtain the response is issued from the client requester means;
   wherein the callback web service is distinct from the client requester means and the response web service means.

2. The system of claim 1 wherein the callback web service means further comprise storage means to store a client identity along with a client request.

3. The system of claim 2 wherein the callback web service means further comprise means for determining whether the at least one client request to call a web service is already stored or not within the storage means.

4. The system of claim 1 wherein the client requests further comprise at least one client request to subscribe to an already stored at least one client request to call a web service.

5. The system of claim 1 wherein the at least one client request to call a web service comprises at least one parameter to define a protocol to be used for delivering the response to the client.

6. The system of claim 5 wherein the protocol is a Simple Mail Transfer Protocol (SMTP) or a Simple Object Access Protocol (SOAP).

7. A computer program product stored on a computer-readable storage medium, which when executed, handles a web service call by clients in a communication network, the computer-readable storage medium comprising program code for:
   issuing at least one client request to call a web service from a client requester, wherein the at least one client request to call a web service is sent to a callback web service;
   registering the at least one client request to call a web service within the callback web service, and invoking a called web service by sending the at least one client request to call a web service to a called web service;
   receiving a response to the at least one client request to call a web service within a response web service; and
   delivering the response manually, based upon when a client request to obtain the response is issued from the client requester;
   wherein the callback web service is distinct from the client requester and the response web service.

* * * * *